United States Patent [19]
Matteson

[11] Patent Number: 5,715,288
[45] Date of Patent: Feb. 3, 1998

[54] INTEGRAL HEAD RIG, HEAD AREA CABLE TRAY AND MISSILE SHIELD FOR PRESSURIZED WATER REACTOR

[75] Inventor: Donn Moore Matteson, South Windsor, Conn.

[73] Assignee: Combustion Engineering, Inc., Windsor, Conn.

[21] Appl. No.: 646,402

[22] Filed: May 9, 1996

[51] Int. Cl.⁶ .................................................. G21C 19/00
[52] U.S. Cl. ................................... 376/263; 376/287
[58] Field of Search ................................ 376/260, 262, 376/263, 287

[56] References Cited

U.S. PATENT DOCUMENTS

| | | | |
|---|---|---|---|
| 3,775,246 | 11/1973 | Frisch et al. | 376/263 |
| 3,836,429 | 9/1974 | Frisch et al. | 376/263 |
| 3,836,430 | 9/1974 | Frisch et al. | 376/263 |
| 4,158,599 | 6/1979 | Andrews et al. | 376/262 |
| 4,302,290 | 11/1981 | Mazur et al. | 376/287 |
| 4,654,188 | 3/1987 | Hankinson | 376/287 |
| 4,678,623 | 7/1987 | Malandra et al. | 376/260 |
| 4,708,843 | 11/1987 | Desfontaines et al. | 376/289 |
| 4,828,789 | 5/1989 | Hankinson et al. | 376/263 |
| 4,830,814 | 5/1989 | Altman | 376/263 |
| 4,857,265 | 8/1989 | Pol et al. | 376/263 |
| 5,225,150 | 7/1993 | Malandra et al. | 376/263 |
| 5,384,812 | 1/1995 | Meuschke et al. | 376/263 |
| 5,465,278 | 11/1995 | Cowan, II et al. | 376/245 |

*Primary Examiner*—Daniel D. Wasil
*Attorney, Agent, or Firm*—Ronald P. Kananen; John H. Mulholland

[57] ABSTRACT

In order to reduce the number of lifts which are required to remove the various equipment normally disposed above the reactor pressure vessel and to make way for refuelling or regular maintenance, the control rod element drive mechanisms are completely enclosed within a cylindrical enclosure which is attached to the head of the pressure vessel. The top of the cylindrical enclosure is closed with a cap-like member which acts as both a missile shield and a head area cable tray. The missile shield, the cylindrical enclosure, the control rod drive mechanisms and the pressure vessel head, are connected to form an integral unit which can be removed in a single lift. Cable trays are pivotally supported on a wall of a building to establish a bridge between the building and the head area cable array and to establish a connection with the control element drive mechanism cables. During lifting, the control element drive mechanism cables are disconnected and the pivotal bridge trays are swung out of the way. During normal operation, the cylindrical enclosure guides a flow of cooling air over the control rod drive mechanisms.

17 Claims, 9 Drawing Sheets

INTEGRAL HEAD RIG, HEAD AREA CABLE TRAY AND MISSILE SHIELD FOR PRESSURIZED WATER REACTOR

BACKGROUND OF THE INVENTION

1. Field of the Invention

The present invention relates generally to a pressurized water reactor. More specifically, this invention relates to a structural arrangement for use with a pressurized water reactor which reduces the number of structural elements that must be individually removed from above a reactor pressure vessel in order to refuel and/or perform routine maintenance.

2. Description of the Related Art

In order to refuel a pressurized water reactor, it is necessary to remove various pieces of equipment which are located directly over the reactor vessel and the reactor vessel closure head before removing the upper reactor internal structures (upper guide structure). In currently proposed designs, this removal of equipment requires multiple lifts of various structures. The missile shield, control element drive mechanism cables, other cables attached to the head area, the supporting structure for the cables, ductwork for directing airflow to cool the control element drive mechanisms (CEDMs), and thermal insulation on the reactor vessel flange must be removed before the reactor vessel closure head itself can be removed.

Other important considerations in the design of the head area are as follows. The structure must provide separation of safety related cables into channels and separation of the safety related cables from the non-safety related cables to prevent damage to multiple channels due to fire or electrical short circuits. Access must be provided to maintain head area equipment such as venting of the control element drive mechanisms and replacement of the control element drive mechanism components during maintenance. The structures and components must function during seismic events and other accident conditions to allow the plant to be safely shutdown.

A head equipment support structure disclosed in U.S. Pat. No. 4,302,290 to Mazur et al. issued on Nov. 24, 1981, combines the missile shield, control element drive mechanism and other head area cables as well as the cable supports into a single lift. This head equipment support structure however, requires that the cables be disconnected at both ends, at the top of the head lift rig and at the sides of the steam generator walls. This operation requires a significant amount of time during the critical path of the refueling outage and causes personnel radiation exposure.

SUMMARY OF THE INVENTION

It is therefore an object of the present invention to provide a structure which comprises a number of elements which are interconnected in a manner to form a single integral structure which can be lifted out of the reactor cavity using a single lift and thus reduce the total number of lifting operations which must be carried out during each outage to enable refueling.

It is a further object to provide a missile shield which forms part of the single integral structure, which is smaller and lighter than conventional shields but which, in combination with the rest of the arrangement, increases the missile protection which is provided.

It is yet another object of the present invention to provide a missile shield arrangement which enables the cables which lead to the control element drive mechanisms, to be separated into suitable channels defined along the lower surface of the missile shield and thus enable the cables, the missile shield, the control element drive mechanisms, and the cylindrical enclosure, to be lifted as a single unit.

Another object of the invention is to use the cylindrical enclosure which supports the missile shield, as a guide for directing air flow over the control element drive mechanisms and thus prevent excessive temperatures from developing and accordingly attenuate the chances of fire and other heat related deterioration.

It is a further object of the present invention to utilize mineral insulated (MI) cables in combination with the missile shield and the cylindrical enclosure, to reduce weight, increase flexibility and simplify construction.

It is a still an additional further object of the present invention to provide bridge cable supporting trays which support cables that establish control and power link with the cables associated with the control element drive mechanisms, and which are pivotally supported on the building surrounding the reactor vessel and which can be swung out of the way when lifting is to be carried out.

In brief, the above objects are achieved by an arrangement wherein the control rod element drive mechanisms are completely enclosed within a cylindrical enclosure which is attached to the head of the pressure vessel. The top of the cylindrical enclosure is closed with a cap-like member which acts as both a missile shield and a head area cable tray. The missile shield, the cylindrical enclosure, the control rod drive mechanisms and the pressure vessel head are connected to form an integral unit which can be removed in a single lift. Bridge cable trays are pivotally supported on a wall of a building to bridge the gap between the building and the head area cable array and to establish a connection with the control element drive mechanism cables. During lifting, the control element drive mechanism cables are disconnected from the pivotal bridge cable trays and the trays are then swung out of the way. During normal operation, the cylindrical enclosure also guides a flow of cooling air over the control rod drive mechanisms.

More specifically, a first aspect of the invention resides in a nuclear reactor arrangement comprising: a pressure vessel head for closing a pressure vessel; a control rod drive mechanism means disposed above the pressure vessel head for controlling the movement of control rods which are selectively extendible between fuel rods which are disposed in an interior of the pressure vessel; a cylindrical enclosure member having upper and lower ends, the cylindrical enclosure being disposed about the control rod control means with the lower end connected to a top of the pressure vessel head; a missile shield connected to the upper end of the cylindrical member, the missile shield closing the upper end of the cylindrical enclosure; and connection means rigid with the cylindrical member, for connecting the cylindrical member to lifting means and for lifting the pressure vessel head, the control rod control means, the cylindrical member, and the missile shield, up from the pressure vessel as an integral unit, by the lifting means.

A further important feature of the invention resides in that the above mentioned structure further comprises: a plurality of control rod drive mechanism cables which are operatively connected with the control rod mechanism means; and a plurality of ribs formed on the lower surface of the missile shield, the ribs separating and supporting the plurality of cables.

Another feature of the invention resides in that the reactor is disposed within a building having a wall, and further comprises: a pivotal bridge cable tray which is pivotally supported on the wall of the building at a location proximate the missile shield; and a plurality of bridge cables supported on the bridge cable tray, the plurality of bridge cables being operatively connected with the plurality of control rod drive mechanism cables.

A further feature of the invention resides in that the cylindrical enclosure further comprises a plurality of apertures which are formed in the cylindrical enclosure proximate the lower end of the cylindrical enclosure for permitting air to flow through the interior of the cylindrical enclosure.

Yet another feature of the invention resides in that the cylindrical enclosure further comprises a plenum plate, the plenum plate being disposed in the cylindrical enclosure between the upper end and the plurality of apertures for modifying the flow of air through the cylindrical enclosure.

A further feature of the invention resides in that the missile shield is formed with a plurality of apertures through which the control rod drive mechanism means are accessible and through which air is ventable, the apertures being sized to prevent the passage of missiles therethrough.

Still another feature of the invention resides in that the missile shield comprises: a plate which is secured directly to the upper end of the cylindrical enclosure; and a plurality of ribs rigidly connected to a lower surface of the plate, the plurality of ribs extending into the upper end of the cylindrical enclosure, the ribs being provided with means for clipping the control rod drive mechanism cables to side surfaces of the ribs and for separating the control rod drive mechanism cables into different groups.

Another notable feature of the invention resides in that the missile shield is provided with peripheral tray means about which the control rod drive mechanism cables can be wound and disposed in a manner which facilitates connection with the bridge cables on the bridge cable tray.

A further notable feature of the invention resides in that the missile shield is so dimensioned and configured that a ring-like stud tensioning device can be lowered into position to release the studs which retain the pressure vessel head on the pressure vessel, while the missile shield is connected to the cylindrical enclosure and thus release the pressure vessel head from the pressure vessel so that the pressure vessel head, the cylindrical enclosure, and the missile shield can be lifted as an integral unit.

BRIEF DESCRIPTION OF THE DRAWINGS

The various objects, advantages and merits of the present invention will become more clearly appreciated as a detailed description of the preferred embodiments of the invention are given in conjunction with the appended drawings in which.

DETAILED DESCRIPTION OF THE PREFERRED EMBODIMENTS

Figure 1:
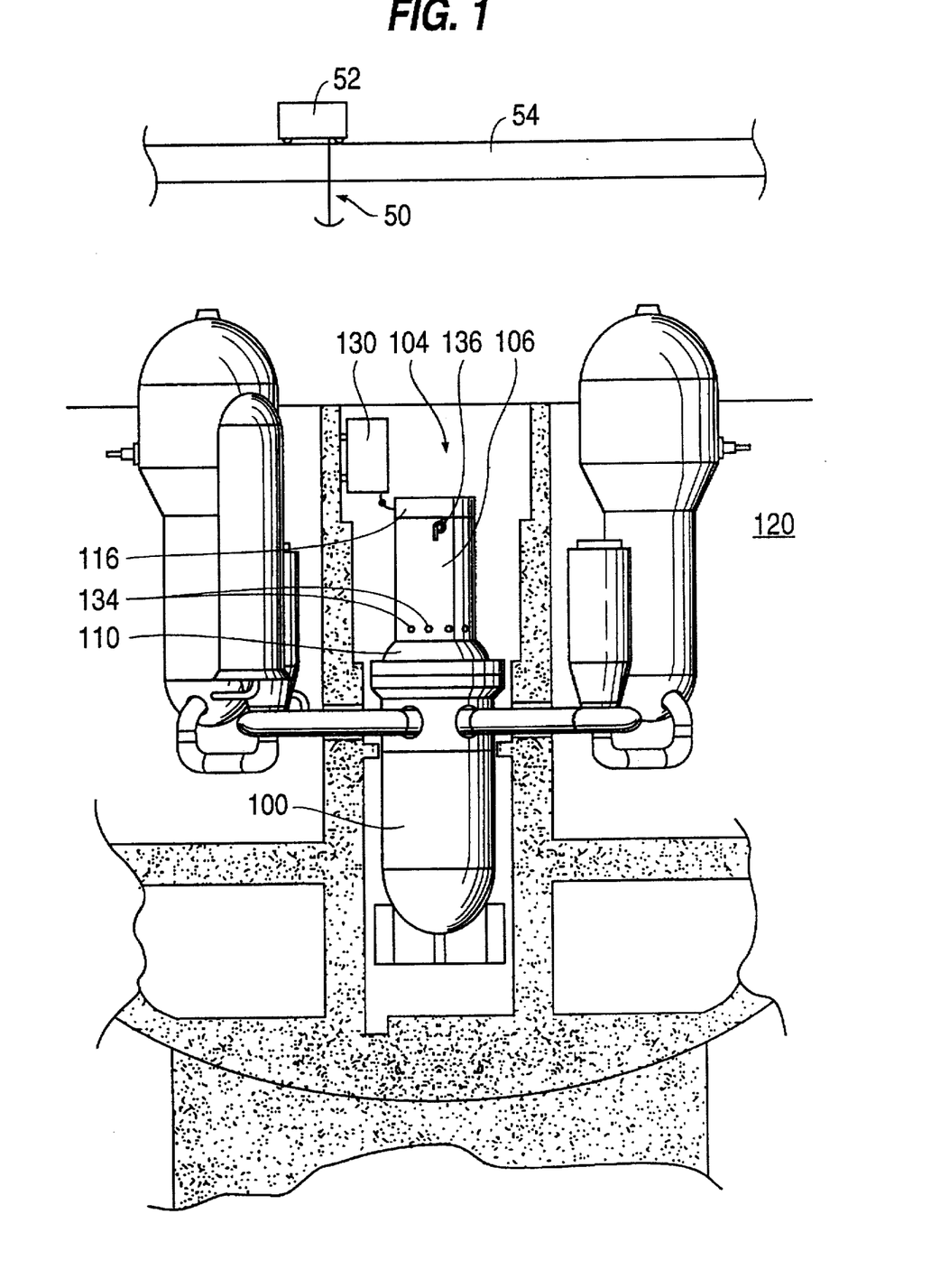
FIG. 1 is a partially cut-away semi-schematic view of a pressurized water reactor (PWR) which is equipped with an embodiment of the invention.
Figure 2:
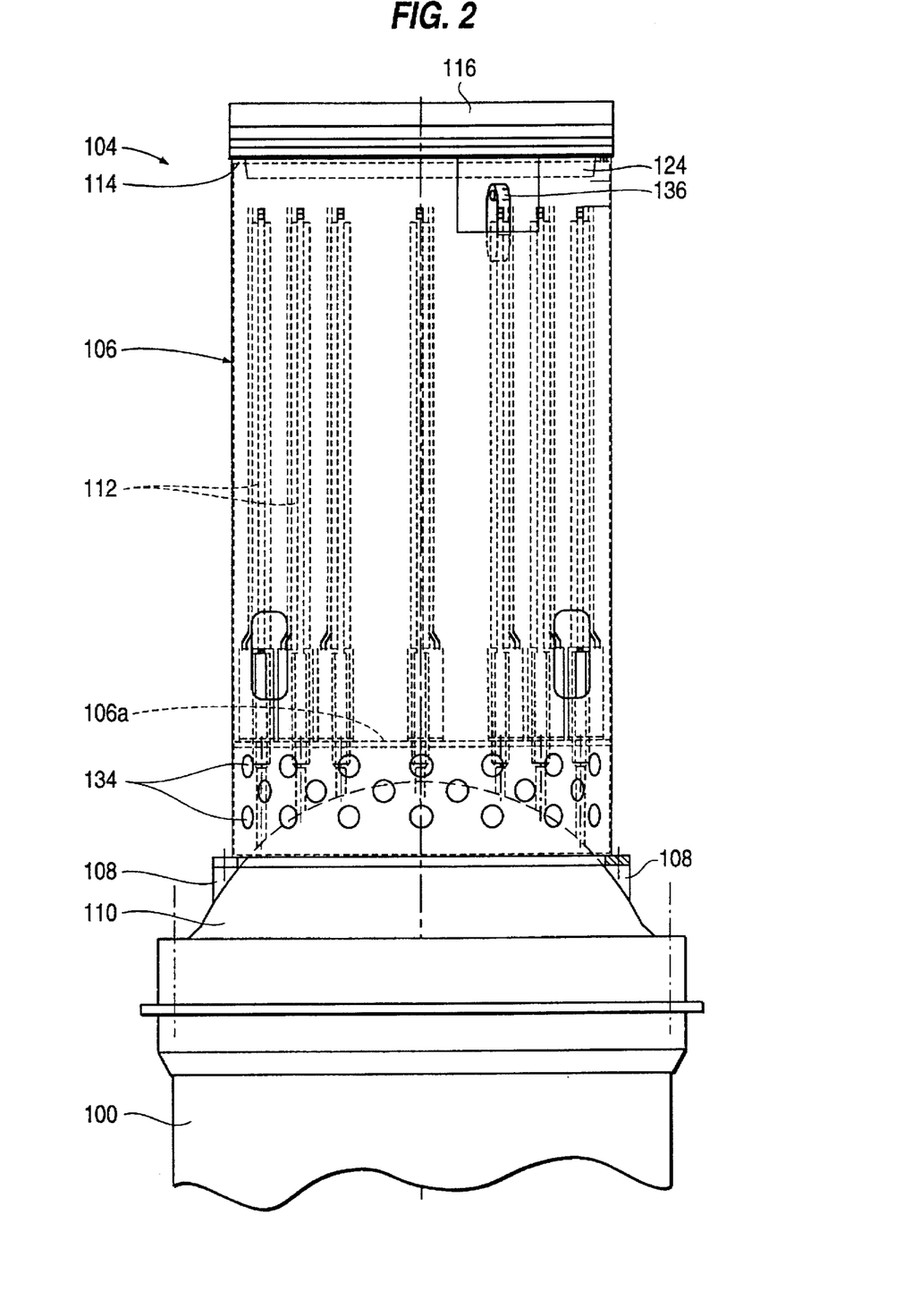
FIG. 2 is a side view of a cylindrical enclosure and missile shield arrangement which forms an essential part of the embodiment depicted in FIG. 1.

FIG. 1 shows a pressure water reactor (PWR) to which the present invention is applied. As shown, the reactor vessel 100 is supported by a containment building 120 in a well known manner. The numeral 104 generally denotes an assembly which characterizes the present invention and which includes a right cylinder or cylindrical enclosure 106 that is attached at its lower end to pads 108 (see FIG. 2) on the reactor vessel closure head 110. The top of the cylindrical enclosure 106 is located above the top of the control element drive mechanisms (CEDMs) 112 and includes a flange 114 for attachment of a missile shield 116 and cable supports 118. The missile shield 116 closes the upper end of the cylindrical enclosure 106 in a manner similar to a cap on a jar, and is bolted to the flange 114 on the cylindrical enclosure 106. The missile shield 116 is of sufficient thickness and strength to preclude head area missiles (typically the control element drive mechanisms 112) from being ejected from the reactor vessel closure head 110 in a manner that could damage other safety related components in the containment building 120. The missile shield 116 further protects the head area equipment from damage by missiles generated elsewhere in the containment building 120. Since the missile shield 116 completely encloses the top of the cylindrical enclosure 106, and the potential head area missiles are located inside of the cylindrical enclosure 106, this arrangement which will be referred to as a "unitized head area" provides an improved capability of preventing damage from missiles as compared to that possible with previous designs.

Figure 3:
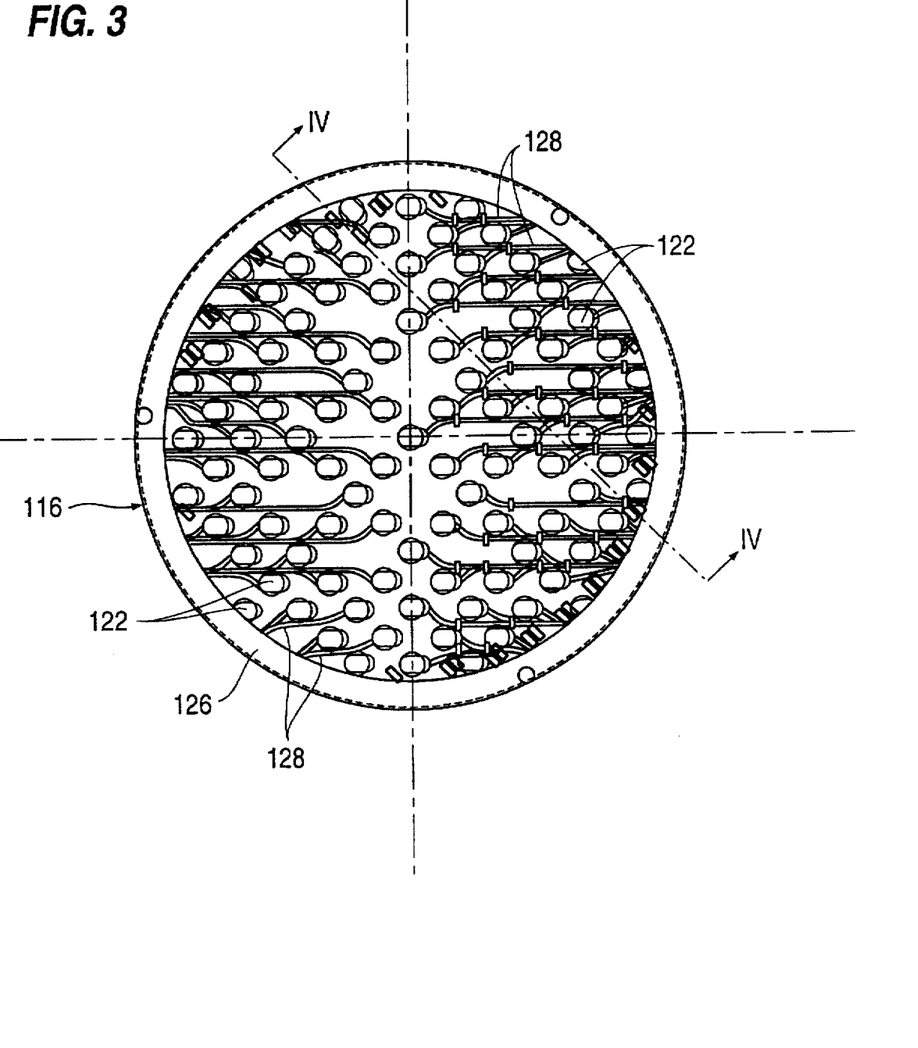
FIG. 3 is an underside view of the missile shield provided at the top of the cylindrical enclosure shown in FIG. 2, illustrating the manner in which the cables which lead to the control element drive mechanisms are arranged along ribs provided on the lower face of the shield.

The missile shield 116 is provided with access openings 122, best seen in FIG. 3, which are located over the control element drive mechanisms 112 to provide a means to operate the control element drive mechanism vents to remove trapped air when the reactor coolant system is refilled after a refueling. Removal of the air is critical to minimizing the potential for stress corrosion cracking of the control element drive mechanism nozzles (not shown). The access openings 122 also provide a means to remove and replace the control element drive mechanism reed switch position transmitters (RSPTs). These reed switch position transmitters are the most commonly serviced control element drive mechanism component. The access openings 122 are carefully sized to prevent missiles from escaping therethrough. The access openings 122 may be provided with covers in order to reduce leakage of cooling air which is induced to flow over the control rod drive mechanisms.

The rigidity of the missile shield 116 is increased by integral ribs 124 (FIG. 4) welded to the bottom of a plate 126 which forms part of the missile shield, and which is securely attached to the cylindrical enclosure 106.

Figure 4:
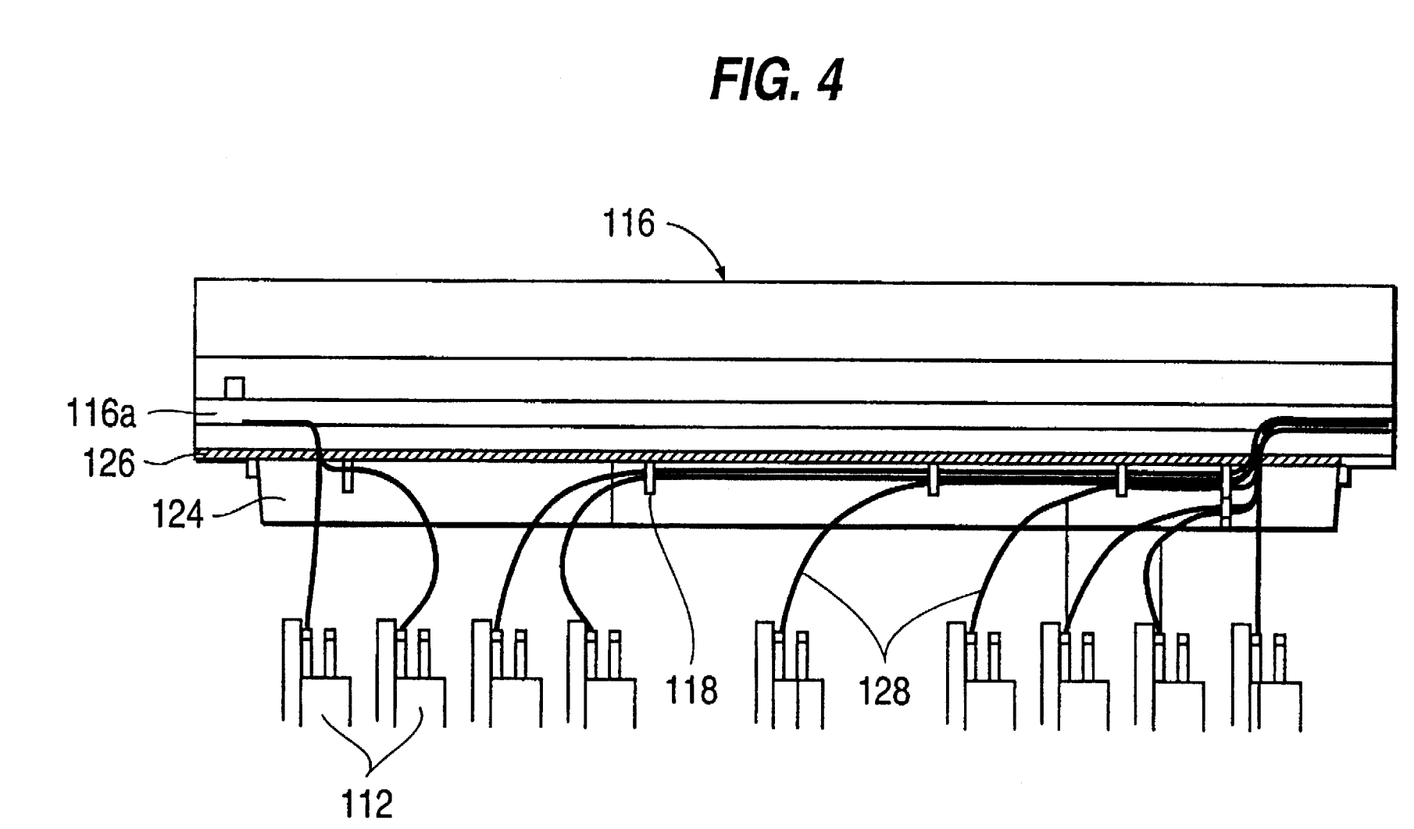
FIG. 4 is a view of the missile shield as taken along section line IV—IV of the structure shown in FIG. 3.

Control element drive mechanism cables 128 consist of two (2) RSPT cables and one (1) power cable, per control element drive mechanism. The RSPT cables are divided into four (4) safety related channels. The power cables are non-safety related. The RSPT cables are routed up to the ribs 124 under the missile shield 116 and are attached to the sides of the ribs 124 for support by the cable supports 118. The cable routing is performed in a manner that uses the ribs to provide the necessary channel separation. The power cables are routed through the access openings 122 in the missile shield 116 and are attached to the top surface of the shield. In all cases, the cables 128 are gathered into circular trays 116a at the periphery of the missile shield 116 and are routed to points where the cables attach to the cables leading from the head area.

Figure 9:
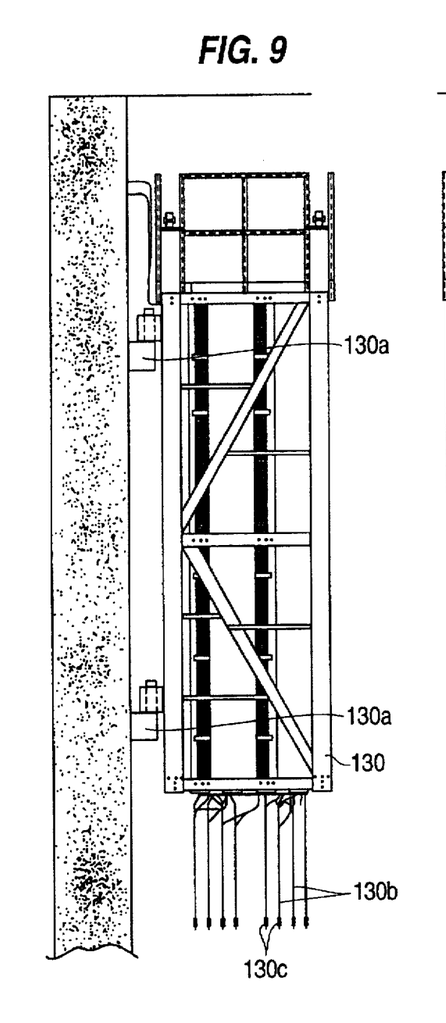
FIG. 9 and FIG. 10 are respectively side and front views of a bridge table tray which is pivotally supported on the building structure and used in combination with the arrangement shown in FIG. 1.
Figure 10:
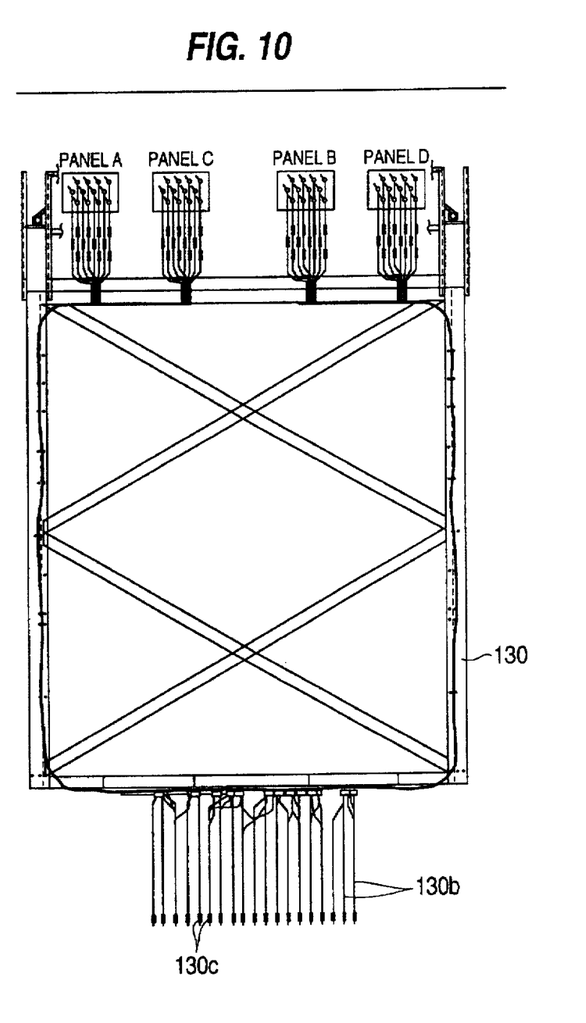

The cables 128 leading from the head area are attached to pivotal trays 130 such as shown in FIGS. 9 and 10. In the illustrated arrangement, the tray is horizontally pivotal about hinges 130a, after the cables 128 are disconnected from the head area cables. The location of the disconnect points for the cables 128 is in an area of lower radiation. This arrangement simplifies the disconnection process to decrease the time required to perform this task. It will be noted that the present invention is not limited to trays which are horizontally pivotal and that vertically pivotal arrangements may also be used if so desired.

When the head area is being prepared for removal, the cable connections to the control element drive mechanisms 122 are not disassembled. This is an important feature in reducing the time and radiation exposure required for head area assembly or disassembly.

The relative position of the ribs 124 with respect to the tops of the control element drive mechanisms 112 is important. A sufficient distance is necessary to allow relative motion (normal operation and seismic) of the control element drive mechanisms 122 to the ribs 124 without exerting a large tensile force on the cables 128. This need is best addressed by a large vertical distance. However, it is also necessary to reach the cable connections from the top of the missile shield 116 for periodic maintenance. This need suggests a small vertical distance is best. The arrangement according to the present invention represents a way to address both of these needs.

Since the missile shield 116 is bolted to the flange 114 on the cylindrical enclosure 106, the missile shield 116 and cables 128 are easily removed by disconnecting the cables 128 and unbolting the missile shield 116 as a unit for major servicing of the control element drive mechanisms 112. This maintenance could involve replacement of the control element drive mechanism coil stack assemblies or the control element drive mechanism motor assembly. This is an important design feature because maintenance can be performed in a timely manner.

Figure 8:
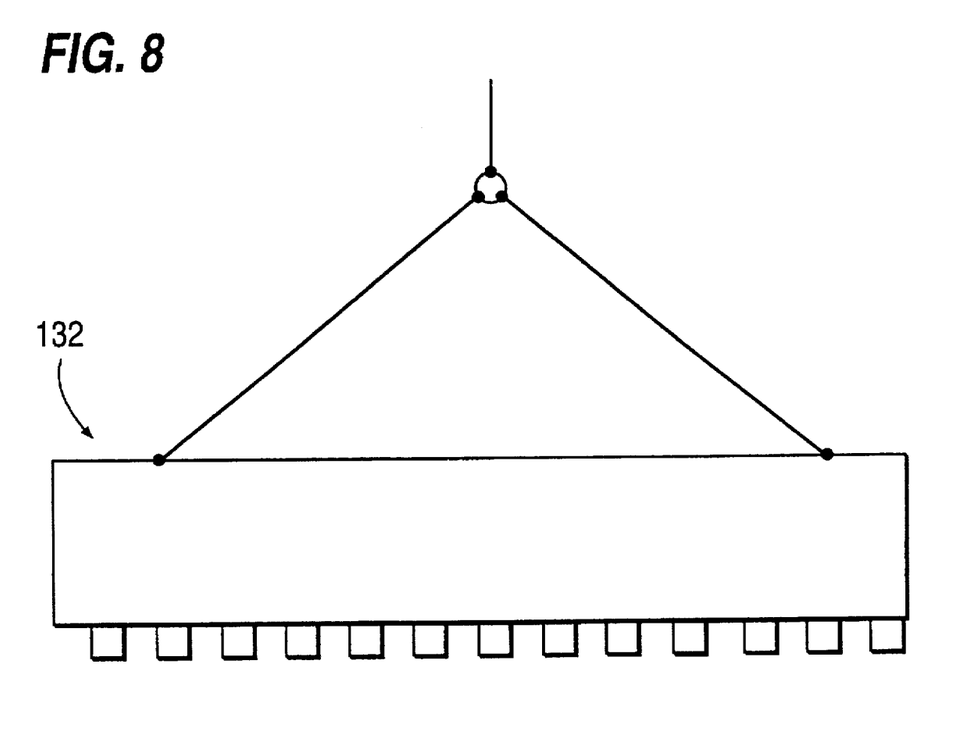
FIG. 8 is a schematic side view showing a multiple stud tensioner which can be used to remove the studs which are used to secure the reactor head to the top of the reactor vessel.

The radial envelope of the cylindrical enclosure 106 and missile shield 116 is established such that an annular multiple stud tensioner 132 of the nature schematically illustrated in FIG. 8, can be lowered over the cylindrical enclosure 106 and missile shield 116 to remove the reactor vessel closure head studs. This is an important feature as the multiple stud tensioner 132 significantly reduces the time and radiation exposure required for the removal and/or installation of the head area equipment. An example of this type of device is manufactured by Westfalia Becorit of Germany.

Figure 5:
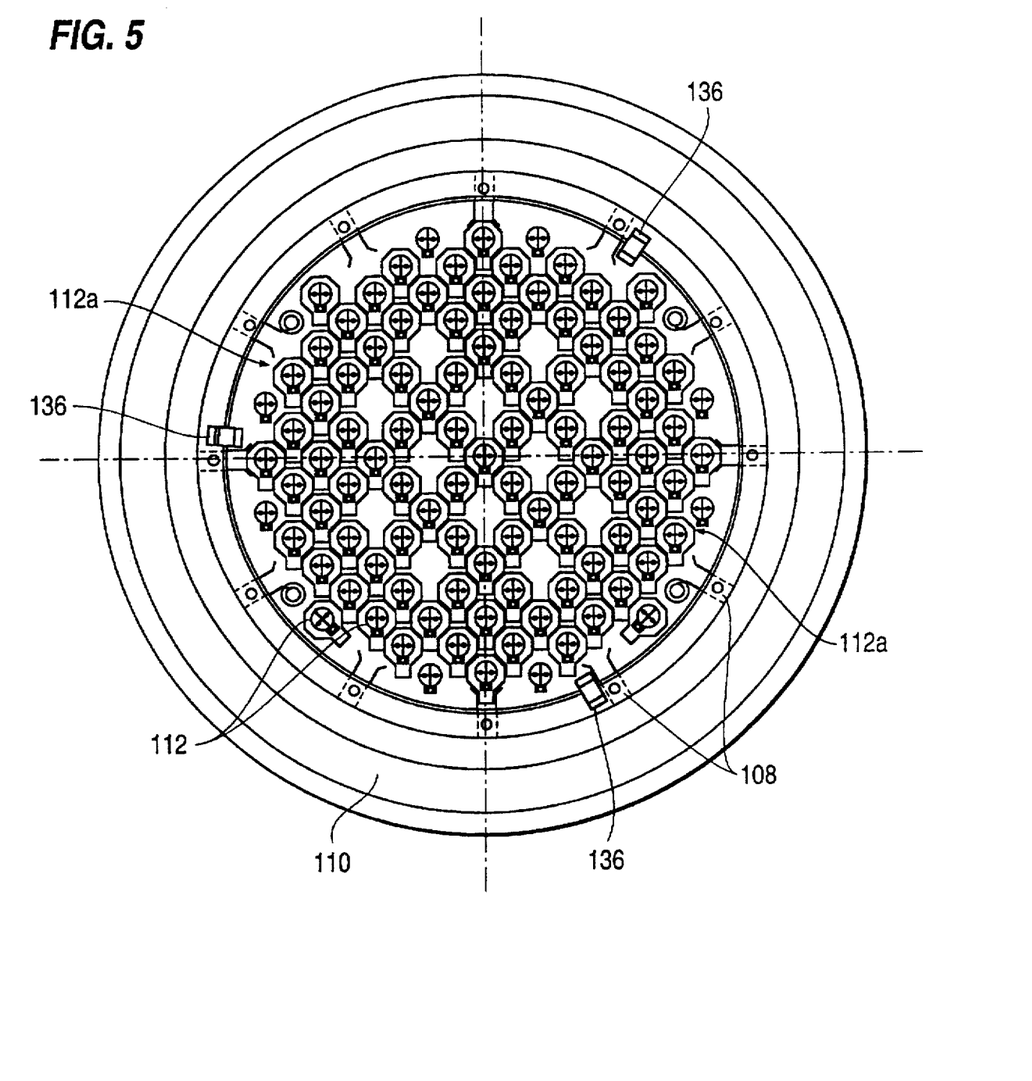
FIG. 5 is a plan view showing the control element drive mechanisms within the cylindrical enclosure as seen with the missile shield removed.
Figure 6:
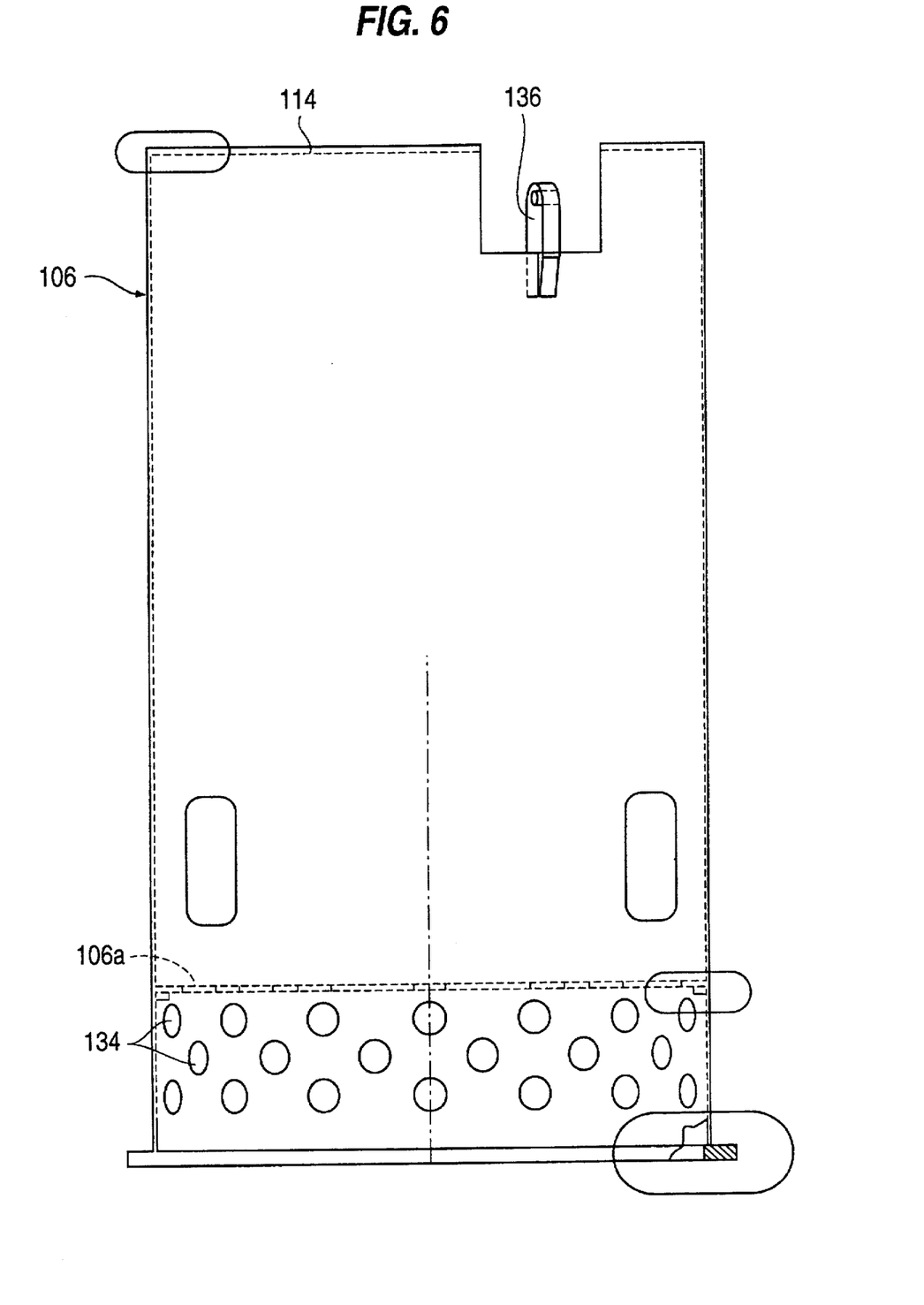
FIG. 6 is a side view showing details of the structure of the cylindrical enclosure.
Figure 7:
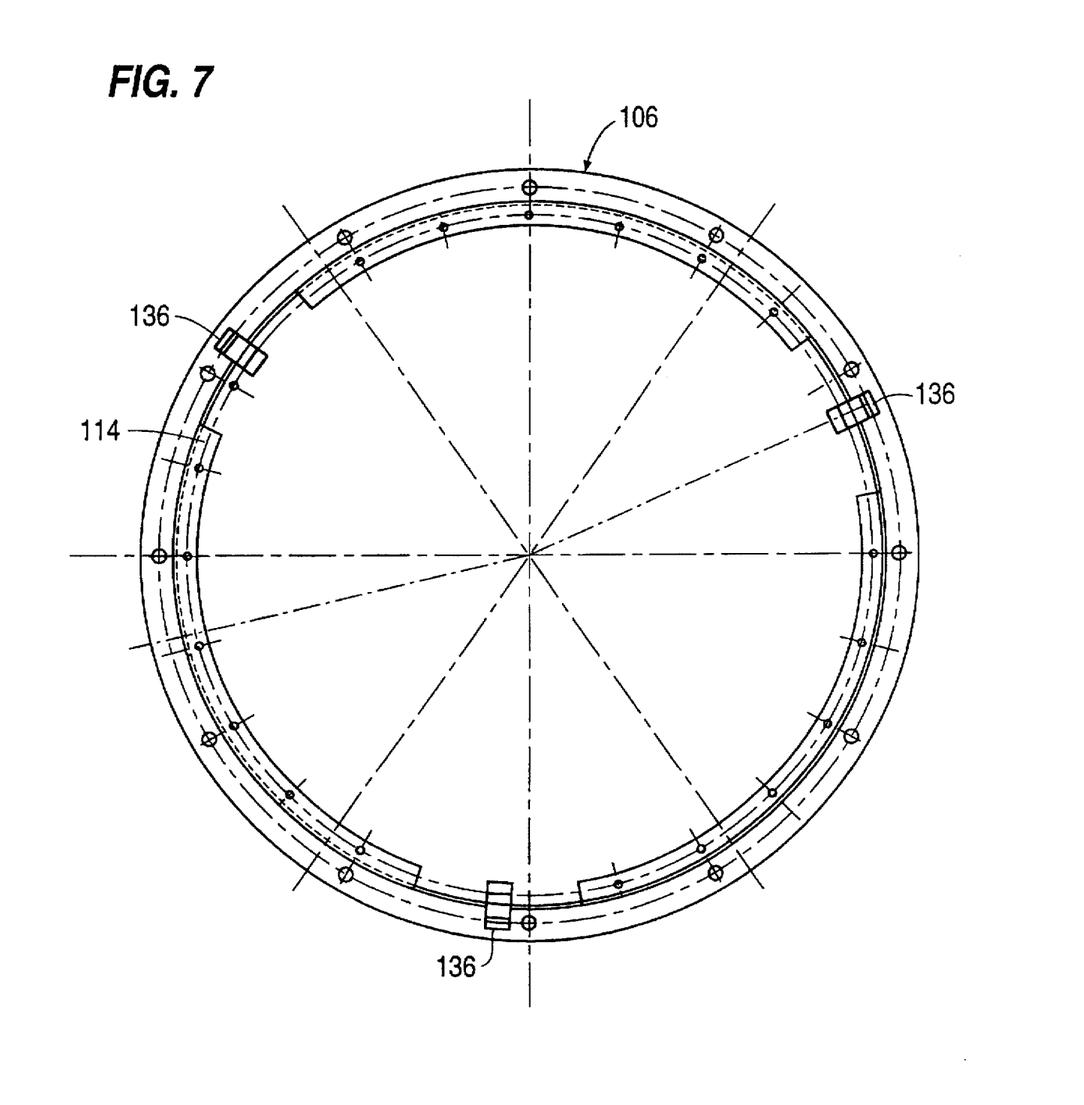
FIG. 7 is a plan view of the cylindrical enclosure shown in FIG. 6.

The cylindrical enclosure 106, in conjunction with a plenum plate 106a which is arranged within the cylindrical enclosure 106 in the manner shown in FIG. 6, and shrouds 112a (see FIG. 5) disposed about the control element drive mechanisms 112, serve to guide cooling air past the control element drive mechanism coil stack assemblies to maintain the assembly temperature within operating limits. The air is introduced through openings at the top of the cylindrical enclosure 106 and forced down past the coil stack assemblies and discharged through holes 134 (see FIG. 6) where the air is discharged to containment. This is the preferred direction of air flow as it allows the use of warmer air and has the least impact on the pressure boundary thermal conditions. Alternately, the air can be blown in the holes 134 at the bottom of the cylindrical enclosure and discharged through the access openings 122 in the missile shield 116.

The cylindrical enclosure 106 is equipped with attachment points or lifting lugs 136 for a lifting fixture 50 including a trolley 52 and a crane rail 54, that is used to lift the reactor vessel closure head 110 and the attached equipment (i.e., elements 106, 112, 116) and transfer it to a laydown area.

The present invention combines the three functions of the typically separate head lift rig (HLR), the head area cable tray system (HACTS) and the head area missile shield (MS). On many, if not most nuclear power plants, there are three separate items consisting of a head lift rig (HLR) attached to the reactor head, a set of removable head area cable tray systems (HACTS) attached to the building structures, and a separate removable missile shield attached to other building structures. U.S. Pat. No. 4,302,290 demonstrates a combined head area cable tray systems and missile shield separate from the head lift rig (HLR). The invention, on the other hand, has a structure built into the top of the head lift rig (HLR) which serves to route the head area cables to the periphery of the head lift rig. This same integral structure serves to function as the required missile shield.

As mentioned above, the invention also includes additional bridge cable trays (BCTs) 130 such as shown in FIGS. 9 and 10, which are attached to and pivotally supported by the containment building structure to bridge the gap from the head lift rig (HLR) to the building structure, and serve to carry and route the cables 128 from the head lift rig (HLR) to the building. These bridge cables 130b are provided with cable connectors 130c to enable connection with the ends of the cables 128. Once the cables 128 are disconnected from the cables 130a of bridge cable trays 130, the bridge cable trays 130 are swung out of the way and the head area cable tray system (HACTS) and missile shield 116 are removed with the head lift rig and the reactor head 110, in a single lift.

It will be appreciated that the present invention is not limited to the exact structures which have been disclosed supra and that various modifications and changes can be made without departing from the scope of the appended claims.

What is claimed is:

1. A nuclear reactor arrangement comprising:
   a pressure vessel head for closing a pressure vessel;
   a control rod drive mechanism means disposed above said pressure vessel head for controlling the movement of control rods which are selectively extendible between fuel rods which are disposed in an interior of the pressure vessel;
   a cylindrical enclosure member having upper and lower ends, said cylindrical enclosure being disposed about the control rod control means with the lower end connected to a top of the pressure vessel head;

a missile shield connected to the upper end of the cylindrical member, said missile shield closing the upper end of said cylindrical enclosure; and connection means rigid with said cylindrical member, for connecting the cylindrical member to lifting means and for lifting said pressure vessel head, said control rod control means, said cylindrical member, and said missile shield, from the pressure vessel as an integral unit, by the lifting means, and a plurality of control rod drive mechanism cables which are operatively connected with said control rod mechanism means; and a plurality of ribs formed on the lower surface of said missile shield, said ribs separating and supporting said plurality of cables.

2. A nuclear reactor arrangement as set forth in claim 1, wherein the reactor is disposed within a building having a wall, and further comprising:

a pivotal bridge cable tray which is pivotally supported on the wall of the building at a location proximate said missile shield; and a plurality of bridge cables supported on said bridge cable tray, said plurality of bridge cables being operatively connected with said plurality of control rod drive mechanism cables.

3. A nuclear reactor arrangement as set forth in claim 1, wherein said lifting means comprises a plurality of lifting lugs disposed in a spaced relationship about the upper end of said cylindrical enclosure.

4. A nuclear reactor arrangement as set forth in claim 1, wherein said cylindrical enclosure further comprises a plurality of apertures which are formed in said cylindrical enclosure proximate the lower end of the cylindrical enclosure for permitting air to flow through the interior of said cylindrical enclosure.

5. A nuclear reactor arrangement as set forth in claim 4, wherein said cylindrical enclosure further comprises a plenum plate, said plenum plate being disposed in said cylindrical enclosure between the upper end and said plurality of apertures for modifying the flow of air through said cylindrical enclosure.

6. A nuclear reactor arrangement as set forth in claim 1, wherein said missile shield is formed with a plurality of apertures through which the control rod drive mechanism means are accessible and through which air is ventable, said apertures being sized to prevent the passage of missiles therethrough.

7. A nuclear reactor arrangement, comprising:

a pressure vessel head for closing a pressure vessel;

a control rod drive mechanism means disposed above said pressure vessel head for controlling the movement of control rods which are selectively extendible between fuel rods which are disposed in an interior of the pressure vessel;

a cylindrical enclosure member having upper and lower ends, said cylindrical enclosure being disposed about the control rod control means with the lower end connected to a top of the pressure vessel head;

a missile shield connected to the upper end of the cylindrical member, said missile shield closing the upper end of said cylindrical enclosure; and connection means rigid with said cylindrical member, for connecting the cylindrical member to lifting means and for lifting said pressure vessel head, said control rod control means, said cylindrical member, and said missile shield, from the pressure vessel as an integral unit, by the lifting means, wherein said missile shield comprises:

a plate which is secured directly to the upper end of said cylindrical enclosure; and a plurality of ribs rigidly connected to a lower surface of said plate, said plurality of ribs extending into the upper end of said cylindrical enclosure, said ribs being provided with means for clipping said control rod drive mechanism cables to side surfaces of said ribs and for separating said control rod drive mechanism cables into different groups.

8. A nuclear reactor arrangement as set forth in claim 7, wherein said missile shield is provided with peripheral tray means about which said control rod drive mechanism cables can be wound and disposed in a manner which facilitates connection with said bridge cables.

9. A nuclear reactor arrangement as set forth in claim 1, wherein said missile shield is so dimensioned and configured that a ring-like stud tensionining device can be lowered into position to release the studs which retain the pressure vessel head on the pressure vessel, while said missile shield is connected to said cylindrical enclosure and thus release the pressure vessel head from the pressure vessel so that the pressure vessel head, the cylindrical enclosure, and the missile shield can be lifted as an integral unit.

10. A nuclear reactor arrangement comprising:

a pressure vessel head for closing a pressure vessel;

a control rod drive mechanism means disposed above said pressure vessel head for controlling the movement of control rods which are selectively extendible between fuel rods which are disposed in an interior of the pressure vessel;

a cylindrical enclosure member having upper and lower ends, said cylindrical enclosure being disposed about the control rod control means with the lower end connected to a top of the pressure vessel head;

a missile shield connected to the upper end of the cylindrical member, said missile shield closing the upper end of said cylindrical enclosure; and connection means rigid with said cylindrical member, for connecting the cylindrical member to lifting means and for lifting said pressure vessel head, said control rod control means, said cylindrical member, and said missile shield, from the pressure vessel as an integral unit, by the lifting means.

11. A nuclear reactor arrangement as set forth in claim 10, wherein the reactor is disposed within a building having a wall, and further comprising:

a pivotal bridge cable tray which is pivotally supported on the wall of the building at a location proximate said missile shield; and a plurality of bridge cables supported on said bridge cable tray, said plurality of bridge cables being operatively connected with said plurality of control rod drive mechanism cables.

12. A nuclear reactor arrangement as set forth in claim 10, wherein said lifting means comprises a plurality of lifting lugs disposed in a spaced relationship about the upper end of said cylindrical enclosure.

13. A nuclear reactor arrangement as set forth in claim 10, wherein said cylindrical enclosure further comprises a plurality of apertures which are formed in said cylindrical enclosure proximate the lower end of the cylindrical enclosure for permitting air to flow through the interior of said cylindrical enclosure.

14. A nuclear reactor arrangement as set forth in claim 13, wherein said cylindrical enclosure further comprises a plenum plate, said plenum plate being disposed in said cylindrical enclosure between the upper end and said plurality of apertures for modifying the flow of air through said cylindrical enclosure.

15. A nuclear reactor arrangement as set forth in claim 10, wherein said missile shield is formed with a plurality of apertures through which the control rod drive mechanism means are accessible and through which air is ventable, said apertures being sized to prevent the passage of missiles therethrough.

16. A nuclear reactor arrangement as set forth in claim 10, wherein said missile shield is so dimensioned and configured that a ring-like stud tensioning device can be lowered into position to release the studs which retain the pressure vessel head on the pressure vessel, while said missile shield is connected to said cylindrical enclosure and thus release the pressure vessel head from the pressure vessel so that the pressure vessel head, the cylindrical enclosure, and the missile shield can be lifted as an integral unit.

17. A nuclear reactor arrangement comprising:

a pressure vessel head for closing a pressure vessel;

a control rod drive mechanism means disposed above said pressure vessel head for controlling the movement of control rods which are selectively extendible between fuel rods which are disposed in an interior of the pressure vessel;

a cylindrical enclosure member having upper and lower ends, said cylindrical enclosure being disposed about the control rod control means with the lower end connected to a top of the pressure vessel head;

a missile shield connected to the upper end of the cylindrical member, said missile shield closing the upper end of said cylindrical enclosure; and connection means rigid with said cylindrical member, for connecting the cylindrical member to lifting means and for lifting said pressure vessel head, said control rod control means, said cylindrical member, and said missile shield, from the pressure vessel as an integral unit, by the lifting means, wherein the reactor is disposed within a building having a wall, and further comprising:

a pivotal bridge cable tray which is pivotally supported on the wall of the building at a location proximate said missile shield; and a plurality of bridge cables supported on said bridge cable tray, said plurality of bridge cables being operatively connected with said plurality of control rod drive mechanism cables, and wherein said missile shield is provided with peripheral tray means about which said control rod drive mechanism cables can be wound and disposed in a manner which facilitates connection with said bridge cables.

* * * * *